United States Patent [19]

Michel et al.

[11] 4,263,266

[45] Apr. 21, 1981

[54] PROCESS FOR THE PREPARATION OF CRYSTALLINE, ALKALINE, ALUMINOSILICATE

[75] Inventors: Max Michel, Yerres; Georges Vrisakis, Collonges; Laurent Seigneurin; Gilbert Bouge, both of Salindres, all of France

[73] Assignee: Rhone-Poulenc Industries, Paris, France

[21] Appl. No.: 86,128

[22] Filed: Oct. 18, 1979

Related U.S. Application Data

[63] Continuation of Ser. No. 911,951, Jun. 2, 1979, abandoned.

[30] Foreign Application Priority Data

Jun. 3, 1977 [FR] France ............................ 77 16991

[51] Int. Cl.³ .......................................... C01B 33/28
[52] U.S. Cl. .................................. 423/329; 423/328
[58] Field of Search ............................ 423/328–330; 252/89, 131, 140, 179

[56] References Cited

U.S. PATENT DOCUMENTS

| | | | |
|---|---|---|---|
| 3,071,434 | 1/1963 | Frillette et al. | 423/329 |
| 3,425,800 | 2/1969 | Hirsh | 423/329 |
| 3,985,669 | 10/1976 | Krummel et al. | 252/89 R X |
| 4,019,999 | 4/1977 | Ohren et al. | 252/89 R X |
| 4,041,135 | 8/1977 | Williams et al. | 423/329 |
| 4,071,377 | 1/1978 | Schwuger et al. | 423/329 X |
| 4,073,867 | 2/1978 | Roebke et al. | 423/329 |
| 4,150,100 | 4/1979 | Kettinger et al. | 423/329 |

*Primary Examiner*—Edward J. Meros
*Attorney, Agent, or Firm*—Burns, Doane, Swecker & Mathis

[57] ABSTRACT

A crystalline, alkali metal aluminosilicate of type 4A is prepared by reaction between an aqueous solution of an alkali metal silicate and an aqueous solution of an alkali metal aluminate, and includes the steps of (i) introducing a flow of at least a portion of at least one of said reactant solutions into a reaction zone; (ii) co-introducing with said flow (i) an in line flow of at least a portion of the other reactant solution into said reaction zone; (iii) thus establishing in said reaction zone a liquid mixture of said aqueous reactant solutions and said liquid admixture comprising a gel-formation medium; (iv) establishing gel-formation elevated temperatures within said gel-formation medium to effect formation of a mixture comprising an aluminosilicate gel-phase and a mother liquid; (v) recycling said gel-phase/mother liquor to said flow (i); (vi) maintaining said gel-phase comprising said gel-formation medium under such elevated temperatures for such period of time as to effect crystallization of the aluminosilicate, and whereby a suspension of aluminosilicate crystals of type 4A in liquid phase results; and (vii) thence recovering said aluminosilicate crystals from said resulting liquid phase.

The resultant aluminosilicate crystals are useful, e.g., detergent additives.

23 Claims, 1 Drawing Figure

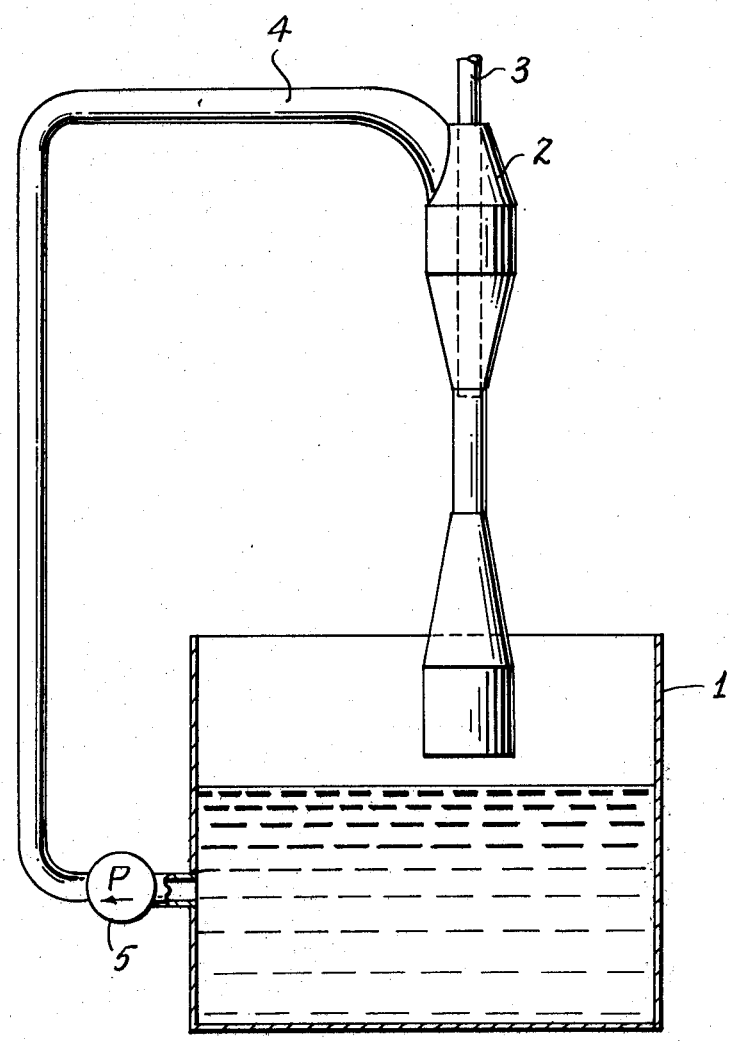

PROCESS FOR THE PREPARATION OF CRYSTALLINE, ALKALINE, ALUMINOSILICATE

This is a continuation of application Ser. No. 911,951, filed June 2, 1979, now abandoned.

BACKGROUND OF THE INVENTION

1. Field of the Invention

The present invention relates to alkaline synthetic crystalline aluminosilicates and a process for preparing same, compositions thereof, and their use as a detergent additive.

2. Description of the Prior Art

The general method for preparing synthetic crystalline aluminosilicates having a zeolitic structure has long been known to the art (see, e.g., Kurnakow, *Journal de l'Academie des Sciences d'URSS*, 1381 (1937). According to this method of preparation, a silicate containing solution and an aluminate containing solution are brought into contact with each other in order to obtain a gel, which gel subsequently undergoes crystallization.

The formation of crystalline aluminosilicates is influenced by a great number of different parameters, such as the concentration of the reactants, the molar ratio between the reactants, the temperature at the time of combining the solutions, the temperature during the gel formation and the aging period, length of the aging period, homogeneity of the reaction medium, etc.

Inocculation methods have also been used in order to obtain aluminosilicates with specific predetermined characteristics. For example, the preparation of faujasite in a reaction medium already containing a zeolite of the type 4A is known from the French published patent application No. 2,281,315.

In a process which is disclosed in the French Pat. No. 1,404,467, it was observed that the soda concentration in the liquid medium wherein the precipitating of the aluminosilicates had occurred, considerably influenced the regularity and the purity of the resulting crystalline zeolite 4A, and that the more constant the concentration was maintained, the higher were the purity and the homogeneity of the resulting zeolite.

In this type of process, the aim is to achieve a homogeneous gel wherein the molar ratio $SiO_2/Al_2O_2$ is close to 2.

According to a process for preparing crystalline zeolites of the type "A", which is disclosed in U.S. Pat. No. 3,071,434, the kinetics of the formation of zeolites of the 4A type is improved by inocculating the fresh reaction mixture with a portion of the resulting crystal containing reaction slurry which is recycled from a point downstream of the gel formation zone. Yet, in practice, such a process is usually hampered by various difficulties, which are discussed in the U.S. Pat. No. 3,425,800.

The U.S. Pat. No. 3,425,800 discloses a process for preparing crystalline zeolites using a stratified crystallization zone containing 3 strata. According to this process, an aluminosilicate gel suspension, which has been previously formed in the cold, is heated to about 100° C. and then is introduced into the crystallizer, wherein the formation of the crystalline aluminosilicate takes place. According to this process, the crystals are recovered by decanting, yet the concentrations of the various reactants, which are disclosed in this process are so low that a relatively diluted reaction medium is maintained.

The French Pat. No. 2,096,360 discloses a direct crystallization process without passing through a multiple step gel forming operation, wherein an aqueous sodium silicate solution is preheated to approximately the precipitating temperature and this hot solution is then added to a solution of sodium aluminate which is equally maintained at the precipitating temperature.

Pre-heating of the reactants as such has already been known in the art for a long period of time, e.g., from the above mentioned article of Kurnakow. The usefulness of such pre-heating has also been shown in the French Pat. No. 1,536,947, which discloses a process, wherein a solution of sodium silicate and a solution of sodium aluminate each are heated separately to a temperature of between 85° and 104° C. and subsequently the sodium aluminate solution is added to the sodium silicate solution under strong agitation, and the mixture is heated to its boiling temperature for a very short period of time until a precipitate of amorphous aluminosilicate is obtained. Then the degree of agitation and the temperature are reduced in order to obtain a crystallized zeolite which is enriched in silica.

Yet generally no information concerning the relationship between the grain-size distribution of the resulting product and the applied process conditions is given in any of the prior art references, except for the French patent application No. 2,286,794, according to which the reaction medium is subjected to shearing forces during the crystallization and/or the adjustment of the temperature. In this process the reactants are introduced into the reaction zone in bulk.

Even though the mechanism of the zeolite formation is still not too well known, it has been shown that under certain reaction conditions, aluminosilicate crystals appear without any intermediary precipitation (J. L. Guth, Philippe Cautlet, and Raymond Wey, Soc. Chim. France 5th Series, 1975-11-12, p. 2375). In any case, if industrially feasible conditions are envisioned, it seems that it is advisable, to use such process conditions that the reaction passes through a gel-formation stage.

Furthermore, in such a case, it seems that the final quality of the resulting product depends on the "gel-history".

It is well known that such a gel generally is obtained by reacting a sodium silicate solution with a sodium aluminate solution.

It has also been proposed, in particular in the U.S. Pat. No. 3,425,800, to use a waste solution from the Bayer process for extracting alumina from bauxite ore as a source of sodium aluminate. This so-called "Bayer liquor" comprises neutral sodium carbonate. According to the well-known Bayer process, bauxite is digested in a solution of sodium hydroxide which converts the alumina into soluble aluminate. After the resulting mixture, the resulting liquor is decomposed and an aluminum hydrate is precipitated therefrom, and is filtered out. Yet it is well known that the filtrate from the thus decomposed liquor still includes a certain amount of alumina in form of aluminate which can not be recovered. This evidently affects the profitability of the process.

The synthetic crystalline zeolite products are of particular interest mostly because of their very high absorption activity which is selective with regard to certain molecules, depending on their size and shape, and because of which they are usually designated as molecular sieves.

Yet is has also been suggested to utilize this kind of product because of other properties, in particular their effectiveness as cation exchangers. One of the most common utilizations of this type of activity of the zeolites is their use as additives in detergent compositions, e.g., as water softening agents. In effect, it has long been known to incorporate compounds based on the aluminosilicates into detergent compositions. But this possibility has gained in interest, since, on the one hand, the overwhelming use of trisodium polyphosphate as a detergent additive has been abandoned due to its polluting properties, and on the other hand the art of preparing aluminosilicates in an operable and reproducible manner.

Unfortunately, thus aluminosilicates are used more and more to at least partly replace the trisodium polyphosphates as an additive in detergent compositions. Yet only aluminosilicates, having a sufficiently low particle size and a sufficiently high cation exchanger capacity, can satisfactorily serve this purpose.

SUMMARY OF THE INVENTION

It is an object of the present invention to provide a process for preparing a synthetic crystalline alkaline aluminosilicate, in particular a sodium aluminosilicate of the type 4A, which yields a crystalline product having a low average particle size and a high specific surface, and in particular a product wherein the particle size of the overwhelming majority of the crystals is homogeneously distributed.

It is a further object of the present invention to provide such a process utilizing highly concentrated solutions of the starting materials.

It is a further object of the present invention to provide such a process, wherein the waste liquors of a Bayer process for extracting aluminum hydroxide from bauxite can be utilized as an aluminate source.

It is a further object of the present invention to provide such a process which can be carried out on an industrial scale and/or in a continuous manner.

It is a further object of the present invention to provide such a process which yields a crystalline aluminosilicate which comprises only a minor amount of amorphous by-products and is substantially free of hydroxysodalite.

It is yet another object of the present invention to provide a crystalline synthetic aluminosilicate having a 4A type structure which exhibits a low average particle size and wherein the particle size of the overwhelming majority of the crystals is within a very narrow range.

It is yet another object of the present invention to provide such a crystalline aluminosilicate of the 4A type, wherein the particle size distribution is suitable for use as a detergent additive.

It is still another object of the present invention to provide such a crystalline aluminosilicate which exhibits a large specific surface.

It is yet another object of the present invention to provide such a crystalline aluminosilicate which exhibits an enhanced cation exchange capability and a greater rate of cation exchange.

It is a further object of the present invention to provide such a crystalline aluminosilicate which is useful as a detergent additive and exhibits a high calcium sequestering capacity.

It is a yet further object of the present invention to provide a detergent composition which comprises an aluminosilicate of high cation exchange capacity, in particular calcium sequestering capacity.

In order to accomplish the foregoing objects according to the present invention, there is provided a process for preparing a crystalline sodium aluminosilicate of the type 4A by reacting aqueous solutions of the two reactants sodium aluminate and sodium silicate, which comprises the steps of (a) introducing into a mixing zone of a reactor a flow of a first aqueous liquid comprising a solution of at least part of at least one of the reactants;

(b) introducing a second aqueous liquid comprising a solution of at least part of the other reactant into the mixing zone in line with said flow of the first aqueous solution to form a liquid mixture comprising sodium aluminate and sodium silicate;

(c) transferring the liquid mixture into a gel-formation zone;

(d) heating the liquid mixture in the gel-formation zone to a sufficiently elevated reaction temperature in order to form a mixture comprising an aluminosilicate containing gel-phase and a mother liquor;

(e) recycling the mixture into the flow of the first aqueous liquid of step (a);

(f) maintaining the gel-phase at the elevated reaction temperature for a sufficient period of time to crystallize the aluminosilicate, whereby a suspension of aluminosilicate crystals of the type 4A in a liquid phase is obtained; and (g) recovering the aluminosilicate crystals from said suspension.

According to a preferred embodiment of the present invention, this process is carried out using a reactor which is provided with a Venturi-type device for introducing the second aqueous solution into the flow of the first aqueous solution and/or the recycled mixture.

According to the present invention there are further provided a synthetic crystalline aluminosilicate, which is obtainable by means of the above described process, as well as a detergent composition containing at least one surface active agent and said aluminosilicate.

Further objects, features and advantages of the present invention will become apparent from the detailed description of the invention and its preferred embodiments which follow when considered together with the accompanying FIGURE of drawing.

DETAILED DESCRIPTION OF THE INVENTION

The crystalline sodium aluminosilicates according to the present invention are characterized by highly dispersed particles. The sodium aluminosilicate according to the present invention is further characterized by a strong cation exchange activity, and is particularly suited as a detergent adjuvant.

The process according to the present invention thus leads to a product which has a grain-size distribution and a cation exchange capability which are especially suited for its application in the detergent manufacture. Furthermore, it has unexpectedly been found that, especially in cases where a decomposed waste liquor from a Bayer process is used as an aluminate source, relatively high concentration of the various components can be present in the reaction medium in suspended form, and yet a suitable particle size range and particle size distribution can be obtained.

Furthermore, the process according to the present invention leads to a crystalline product which contains only a small amount of amorphous by-products and is substantially free of hydroxysodalite, even so hydroxysodalite corresponds to a thermodynamically stable phase.

The process according to the present invention comprises reacting a sodium silicate solution with a sodium aluminate solution in order to form an aluminosilicate, containing gel, allowing the gel-phase to age until crystallization of the aluminosilicate has taken place, and finally recovering the resulting aluminosilicate crystals. In the process, according to the present invention, the mixture of aluminate and silicate for the gel-formation is obtained by introducing an aqueous solution of at least part of at least one of the reactants into a flow of an aqueous liquid, comprising at least part of the other reactant and/or the mixture which is recycled from the gel-formation step, whereby this solution is introduced into the reaction zone in a direction which is in alignment with the direction of said flow of liquid and/or mixture.

According to an advantageous embodiment of the present invention, the flow of liquid comprises the aluminate solution and/or the recycled mixture from the gel-formation, and a silicate solution is introduced into this flow of liquid.

According to an embodiment of the invention, the mixing of the reactants is effected by injecting a silicate solution into the axis of a Venturi-system of strong turbulence and coaxially injecting the aluminate solution and recycled mixture from the gel-formation prior to crystallization. In this manner a homogeneous gel, exhibiting a wet cake moisture of more than 75%, is obtained. Preferably, the flow rate of the recycled mixture is more than about 5 times, in particular between about 5 and about 50 times the discharge rate of the silicate solution in order to achieve a nearly instant dilution of the silicate solution.

It is advantageous to carry out the mixing in the heat, preferably at the temperature of the gel-formation, which preferably is in the range between about 60° and about 100° C., most preferably between about 70° and about 90° C.

Mixing under heat can be achieved by pre-heating at least one of the reactants.

Preferably the reaction medium comprises a total alkali content which is equivalent to from about 80 to about 140 g/l of $Na_2O$, and an aluminate content which is equivalent to from about 20 to about 80 g/l of $Al_2O_3$. The silicate concentration preferably is maintained at such a level that the aluminosilicate concentration is between about 50 and about 150 g/l.

The crystallization period suitably comprises between about 1 and about 4 hours and the crystallization temperature suitably is between about 70° and about 90° C., preferably between about 75° and 85° C. Preferably, the reaction mixture is slowly agitated during the crystallization period.

Advantageously, the aluminate content in the mother liquor is equivalent to between about 5 and about 50 g/l of $Al_2O_3$, and the alkali content in this mother liquor preferably is equivalent to from about 70 to about 130 g/l of $Na_2O$.

According to a special embodiment of the present invention, it is possible to still further reduce the grain-size of the resulting product by introducing into the reaction mixture an amount of sodium carbonate which is sufficient to provide an allkali content of the reaction mixture, equivalent to from about 5 to about 40% by weight of sodium oxide. In this case, the sodium carbonate preferably is pre-mixed with at least one of the reactants.

Yet, as has been mentioned above, a major advantage of the present invention resides in the fact that a decomposed waste liquor from a Bayer process which comprises sodium carbonate can be used as an aluminate source according to the process of the present invention.

Unexpectedly, it has been found that within the process according to the present invention any shearing of the reaction mixture is eliminated, yet elevated concentrations of aluminosilicate may be present in the reaction medium and accordingly a high productivity can be achieved, whereby at the same time a grain-size range and distribution are maintained, which previously could not be obtained without working in a considerably more diluted medium. The possibility of working with relatively concentrated reaction mediums, of course, provides considerable savings in energy.

The resulting aluminosilicate crystals are recovered from the crystal slurry which is obtained after crystallization of the gel-phase in a conventional manner. The resulting crystal cake can be dried in any conventional manner. For example, the drying can be effected in a simple and convenient method according to the drying procedure which is disclosed in the French Pat. No. 2,257,326, which provides a rapid and uniform treatment of the product and leads to excellent results. This drying procedure especially permits to eliminate any subsequent grinding of the product.

By the process according to the present invention, aluminosilicates can be obtained which are characterized by a composition corresponding to a molar ratio $Na_2O/Al_2O_3$ of about 1, a molar ratio $SiO_2/Al_2O_3$ of from about 1.8 to about 2, and a molar ratio $H_2O/Al_2O_3$ of from 0 to about 5. Thus, the composition of the sodium aluminosilicates expressed in terms of oxides corresponds to the following empirical unit formula $$xNa_2O.yAl_2O_3.zSiO_2.wH_2O$$

wherein x and y each represent a value of about 1, z represents a value of from about 1.8 to about 2, and w represents a value of from about 0 to about 5. In order to form other than sodium aluminosilicates, it is possible to use solutions of alkali-silicate other than sodium silicate, e.g., potassium- or lithium silicate. Also the crystalline sodium aluminosilicate, according to the present invention, may be ion exchanged with a cation salt solution in a conventional manner, thereby replacing at least a portion of its sodium content by the respective cation. Suitably, such cations may be chosen from the cations of metals of the Groups I through VIII of the periodic table or hydrogen or ammonium, depending on the intended properties of the resulting products.

The crystalline aluminosilicate composition, according to the present invention, comprises more than 85% by weight of the crystalline product, less than 5% by weight of hydroxysodalite, and less than 15% of amorphous aluminosilicate.

The aluminosilicate, according to the present invention, exhibits a cation exchange capacity which is equivalent to a calcium-binding power of from about 250 to about 350 mg of calcium carbonate per g. The aluminosilicate exhibits the following particle size distribution: 50% of the particles exhibit a mean diameter in the range of between about 2 and about 6μ, 95% of the particles are smaller than 10μ, and 99% of the particles are smaller than 15μ.

Due to this favorable particle size distribution and due to the high cation exchange capacity, the crystalline aluminosilicates according to the present invention are suited for use as molecular sieves in different technical fields. E.g., they are useful as adjuvants in detergents, desiccating agents, and separating agents. The aluminosilicates, according to the present invention, are especially well suited for use as detergent additives. In particular, they are useful as calcium sequestering agents which may replace at least part of the sodium tripolyphosphate, which is conventionally used in detergents.

The aluminosilicates, according to the present invention, may be incorporated into any type of detergent composition containing anionic, non-ionic, cationic, ampholytic or Zwitterionic detergents, or mixtures thereof.

The following may be mentioned as examples of anionic surface active agents which can be used within the detergent compositions according to the present invention:

alkali metal soaps of saturated and/or unsaturated fatty acids containing 8-24 carbon atoms;

alkali metal salts of alkyl-, aryl-, and/or aralkyl sulfonates, wherein the alkyl moiety preferably contains 9-13 carbon atoms and the aryl moiety preferably is phenyl or naphtyl, e.g., alkylbenzene sulfonates of the formula

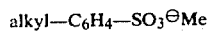

alkali metal, ammonium, and di- or triethanolammonium salts of alkyl- and/or alkenylsulfates containing 8-16 carbon atoms, e.g., alkylsulfates of the formula, alkyl—O—SO$_3^\ominus$Me.

Suitable non-ionic surface active agents are ethoxylated alkyl phenols which contain 5-30 oxyethylene units and wherein the alkyl preferably contains 6-12 carbon atoms, or ethoxylated aliphatic alcohols containing 8-22 carbon atoms.

Suitable cationic surface active agents are N-oxides of mono-alkylamines wherein the alkyl contains 10-20 carbon atoms.

Suitable amphoteric surface active agents are alkyldimethylbetains or alkylamidopropyldimethylbetains, wherein the alkyl contains 8-20 carbon atoms.

In addition to the surface active agents and the aluminosilicates, the detergent composition may further comprise additional conventional builders.

The detergent compositions according to the present invention preferably comprise from about 10 to about 60, most preferably from about 20 to about 40% of the aluminosilicate. The amount of surface active agents may vary from about 5 to about 50%, preferably from about 5 to about 20%.

According to a preferred embodiment of the invention the detergent composition comprises an aluminosilicate and a tripolyphosphate. The by-weight ratio aluminosilicate/tripolyposphate preferably is between about 1/1- and 2/1.

Further to the surface active agents, the aluminosilicate and optionally the additional builders, the detergent compositions may also contain a certain number of conventional ingredients in varying amounts. As examples of such ingredients, there may be cited, for example, foam inhibiting agents, such as polysiloxanes, mineral salts, such as sodium sulfate, bleaching agents, such as hydrogen peroxide and its hydrates, peroxides and per-salts, singly or in mixture with precursors of bleaching agents and anti-redeposition agents, such as carboxymethylcellulose, carboxymethylhydroxyethylcellulose, polyvinyl alcohol, fluorescent agents, such as stilbines, furanes, as well as small amounts of perfumes, colorants, and enzymes.

Obviously, the process according to the present invention can be carried out in a batch-wise operation, yet it prevents a special advantage of this process in that it is possible to use a continuous operation.

The crystallization may be carried out in a crystallization zone of the reactor or in a distinct separate aging apparatus.

The present invention will now be further illustrated by means of the FIGURE of drawing and the working examples below.

The FIGURE of drawing represents a schematic view of an assembly for carrying out the process according to the present invention, which comprises an reactor 1 and a Venturi tube 2 by means of which the reactants are brought into contact with each other.

The silicate solution is introduced through a tube 3, wherein the aluminate solution and/or the recycled mixture are introduced through a tube 4. The latter is associated with a circulating pump 5 in case of recycling of the liquor, which is derived from the reactor 1, into which at the beginning of the operation all or part of the aluminate has been fed.

In the present working examples Venturi tubes have been used. The internal diameter of the cylindrical portion of the Venturi tube, which was used in Examples 7, 8, 9, and 11, was 14 mm, and the diameter of the cylindrical portion of the Venturi tube which was used in Examples 4 and 6, was 40 mm. The solutions of the reactants and the process conditions, in particular the discharge rates, were adjusted so that elevated Reynolds values in the range of about 100,000 were achieved in the cylindrical portion of the Venturi device.

The following Examples 1 to 6 demonstrate the beneficial effect on the reaction which results from using a reactor which is equipped with a device which permits to mix the reactants according to the present invention by introducing the silicate-containing solution into a flow of the aluminate-containing liquid in line with said flow.

Examples 1 to 3 are not prepared according to the process of the present invention. Instead of using a reactor which is equipped with a Venturi device, a mixing reactor was used wherein the agitation is effected by means of a helix-shaped agitator with an energy consumption of 0.2 kwh/m$^3$.

EXAMPLE 1

In to a 20 l mixing reactor, which is provided with a helix-shaped agitator, 16 l of an aluminate solution, having an aluminate content equivalent to 58 g/l of Al$_2$O$_3$ and an alkali content equivalent to 132.9 g/l of Na$_2$O, are added. Within a period of 30 minutes, 1.980 l of a sodium silicate solution, having a silicate content equivalent to 216.2 g/l of SiO$_2$, and and alkali content equivalent to 101.5 g/l of Na$_2$O, are added. During the addition of the silicate, the reaction temperature is maintained at 80° C., then the reaction medium is allowed to age under agitation for a period of 2½ hours at a temperature of 85° C. After the addition of the silicate, a sample of the resulting amorphous cake is taken for analysis. The wet cake moisture of this cake is 76%.

During the aging period, the agitation state is reduced in order to maintain only a mild agitation.

The final aluminosilicate concentration is equivalent to 60 g/l of anhydrous aluminosilicate.

The aluminosilicate cake is filtered off and washed with an amount of 3 l of water per kg of the product and subsequently is dried.

EXAMPLE 2

The same procedure as described in Example 1 was carried out, yet a 200 l reactor was used into which 160 l of the aluminate solutions were introduced and then 19.8 l of the silicate solution added. All the remaining process conditions were identical to those in Example 1.

EXAMPLE 3

In this example, a 20 m$^3$ reactor was used and 1,980 l of the silicate solution was added to 16,020 l of the aluminate solution within a period of 30 minutes.

The wet cake moisture of a sample of the amorphous cake which was taken prior to the aging period, was 72%.

The process conditions as well as the properties of the resulting products, are summarized in Table I below. The tests which were used for evaluating the properties of the resulting aluminosilicates are well known in the art. The cation exchange capacity was determined according to the method which is described in the French patent application No. 2,225,68. The particle size distribution was determined in an aqueous medium by means of an Andreasen pipette.

From the data in Table I it is apparent that in a process, using a conventional mixing operation in a mixer which is agitated by means of a helix agitator (Examples 1–3), if the reactor size is increased, yet all other process parameters are kept identical, the mean diameter of the particles is increased and the amounts of residue, which do not pass through a sieve of 10$\mu$ mesh size or a sieve of 15$\mu$ mesh size are increased also.

The energy consumption is 0.2 kwh/m$^3$.

EXAMPLE 4

The same process conditions as in Example 3 are used and the same amounts of reaction liquids are used, however, the mixing of the reactants is carried out in a reactor which is provided with a pump for recycling a flow of the aluminate-containing liquid and with means for introducing the silicate solution into that flow of liquid in line therewith, and the aluminate-containing liquid is fed into the mixing zone at a discharge rate which is 15 times the discharge rate of the silicate solution, i.e., 50 m$^3$/h.

The wet cake moisture of the amorphous cake is 77%.

The energy consumption is low, in the range of about 0.3 kwh/m$^3$.

If the properties of the product resulting from this example (see Table I below) are compared with those of the product of the foregoing examples, it is observed, that, whereas the average particle size has increased from Example 1 to Example 3 and the cation exchange capacity of the product had decreased, the properties of the product which results from the present example, are of the same order than those of the product resulting from Example 1.

EXAMPLES 5 & 6

These examples are intended to demonstrate the results, which are obtained with the process according to the present invention, if more elevated concentrations are used.

EXAMPLE 5

Into an agitated 25 l reactor, which is not equipped with injecting means, 16.5 l of an aluminate-containing liquid, the aluminate content of which is equivalent to 76.5 g/l of Al$_2$O$_3$ and the alkali-content of which is equivalent to 129.4 g/l of Na$_2$O, and 3.5 l of a silicate solution, the silicate content of which is equivalent to 216.2 g/l of SiO$_2$ and the alkali content of which is equivalent to 106.5 g/l of Na$_2$O, are introduced. The wet cake moisture of the resulting amorphous cake is 75%. The final aluminosilicate concentration, calculated as anhydrous material, is 100 g/l. The production rate, calculated as amount of resulting anhydrous material, is 50 g/l per hour for the crystallization step.

EXAMPLE 6

The same procedure as in Example 5 is carried out, yet the mixing is effected in a 30 m$^3$ reactor, using a Venturi tube for introducing the silicate solution into a recycled flow of aluminate-containing liquid, whereby the recycling flow rate of the aluminate-containing liquid is 50 m$^3$/h.

If the properties of the product, obtained according to the present examples, is compared with the properties of the products obtained in the two previous examples (compare Table I below), it is observed that even though the concentrations have been increased, a small particle size is maintained and a high portion of the product is crystalline; and that if all other process conditions are kept equal, a smaller particle size distribution is obtained, if the volume of the reactor is increased.

The wet cake moisture of the amorphous cake, obtained in this example, is 80%.

In the following two examples, 7 and 8, a decomposed waste liquor of a Bayer process is used as an aluminate source. In both cases good results are obtained.

Example 9 is different in that a synthetic aluminate-containing liquor is used as the aluminate source.

Example 10 does not comply with the process of the present invention.

From the data in Table I it can be seen that the particle size of the product obtained in Example 10 is larger than that of the product which is obtained in Example 11 by the process according to the present invention.

EXAMPLE 7

A decomposed waste liquor from a Bayer process, having a specific weight of 1.27, an aluminate-content equivalent to 100 g/l of Al$_2$O$_3$ and a total alkali-content of 182 g/l of Na$_2$O is diluted to obtain 2 m$^3$ of a diluted solution wherein the aluminate concentration is equivalent to 64 g/l of Al$_2$O$_3$ and the total alkali-content is equivalent to 111 g/l of Na$_2$O, 15.4 g of which are in the form of carbonate. This solution is introduced into a 3 m$^3$ reactor which is agitated by means of a helix-shaped agitator. 500 l of a silicate solution, the silicate content of which is equivalent to 199 g/l of SiO$_2$ and the alkali-content of which is equivalent to 92 g/l of Na$_2$O, is introduced into the mixing zone of the reactant by means of a Venturi device at a temperature of 75° C. within a period of 45 minutes, whereby the aluminate-containing liquid is recycled at a rate of 10 m³/h. The resulting gel has a wet cake moisture of 84.4%. Subsequently, the gel is allowed to crystallize at a temperature of 81° C. for a period of 2 hours.

EXAMPLE 8

The same decomposed waste liquor from a Bayer process is diluted to obtain a solution, the aluminate content of which is equivalent to 62 g/l of $Al_2O_3$ and the total alkali content of which is equivalent to 106 g/l of $Na_2O$, 16.3 g/l of which are in the form of carbonate. In a Venturi apparatus this aluminate solution is mixed with 750 l of diluted silicate solution, the silicate content of which is equivalent to 199 g/l of $SiO_2$ and the alkali content of which is equivalent to 92 g/l of $Na_2O$. The recylcing rate for the aluminate-containing solution is 7 times the discharge rate of the silicate solution.

The resulting gel is crystallized at a temperature of 81° C. for a period of 2 hours.

The mother liquors had an aluminate content equivalent to 17.2 g/l of $Al_2O_3$ and a total alkali content equivalent to 85.1 g/l of $Na_2O$. The wet cake moisture of the amorphous cake was 81%.

EXAMPLE 9

The same process conditions as in Example 8 are used, however the aluminate-containing solution is a synthetically imitated liquor, i.e., an aluminate solution to which carbonate has been added in order to obtain a similar composition as that of the decomposed waste liquor from a Bayer process.

The properties of the product, obtained in this example, are in all points identical to those of the product obtained in Example 8 with the exception that the wet cake moisture of the amorphous cake is 82%.

EXAMPLE 10

To 2.65 m³ of a waste liquor from a Bayer process, the aluminate content of which is equivalent to 58 g/l of $Al_2O_3$ and the alkali content of which is equivalent to 108 g/l of $Na_2O$, 16.3 g/l of which are in the form of carbonate, 670 l of a silicate solution, the alkali content of which is equivalent to 94 g/l of $Na_2O$ and the silicate content of which is equivalent to 204 g/l of $SiO_2$, are added within a period of 30 minutes at a temperature of 75° C. After an aging period of 3 hours at a temperature of 81° C., a suspension, containing 128 g/l of crystalline aluminosilicate of the type 4A, the properties of which are given in Table I below (see Example 10 therein), is obtained (this equals a content of 120 g/l of anhydrous product). The wet cake moisture of the amorphous cake prior to crystallization is 72%.

EXAMPLE 11

The procedures described as in Example 10 are carried out, yet the recycling and injecting of the solutions is effected by means of aspiration by a pump, whereby 15 parts by volume of the aluminate-containing solution are recycled per 1 part per volume of added silicate solution.

The mother liquor had an aluminate content equivalent to 10.9 g/l of $Al_2O_3$ and a total alkali content equivalent to 87.9 g/l of $Na_2O$. The wet cake moisture of the amorphous cake was 82%.

Furthermore, the detergent activity of the product obtained in this example is determined in a washing test at a temperature of 90° C., using samples of a cotton fabric which has been soiled with a soiling composition which is prepared and standardized by Waeschereiforschungsinstitut Krefeld.

The tests are carried out by means of a Linitest apparatus (Original Honau). Into each receptacle two soiled samples (4.2 g) and non-soiled samples of the cotton fabric (4.2 g) and 100 ml of a detergent composition, the composition of which is given below, are introduced. An amount of 9 g/l of the following detergent composition is used:

| | |
|---|---|
| Sodium alkylbenzene sulfonate ($LAB_1$ = alkyl ~ 12C) | 5.3% |
| Non-ionic surface agent (C16/14 OE) (ethoxylated ~ C16 alcohol containing ~ 14 oxyethylene units) | 2% |
| Sodium stearate | 2.3% |
| Sodium tripolyphosphate | 14.2% |
| Sodium aluminosilicate | 35% |
| Sodium perborate | 22.1% |
| Sodium silicate | 2.5% |
| Carboxymethylcellulose | 1.2% |
| Magnesium silicate | 1.7% |
| Sodium sulfate | 2.1% |
| Water | up to 100% |

After washing, the samples are rinsed 4 times for a period of 30 seconds each with water having a hardness of 30 Th (NF 90003).

The reflectance of the samples is determined before and after the washing by means of a photoelectrical photometer (tradename Elrepho, manufacturer Zeiss) using a filter No. 6.

The observed increase in reflectance is 58.2 which corresponds to a value which is usually observed for an aluminosilicate, having a good cation exchange capacity.

EXAMPLE 12

This example demonstrates that even if the volume of the reaction medium is reduced, in this case the recycling according to the present invention, is omitted, the size of the crystals remains relatively large. The procedure in this example indeed is identical to that of Example 11, except for the reactor volume of 250 l and the absence of the Venturi device.

TABLE I

| PROCESS CONDITIONS | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Aluminate Solution aluminate content calculated as $Al_2O_3$ g/l | 58 | 58 | 58 | 58 | 76.5 | 76.5 | 64 | 62 | 62 | 58 | 58 | 58 |
| total alkali content calculated as $Na_2O$ | 132.9 | 132.9 | 132.9 | 132.9 | 129.4 | 129.4 | 111 | 106 | 106 | 108 | 108 | 108 |
| alkali derived from added $Na_2CO_3$ | 0 | 0 | 0 | 0 | 0 | 0 | | | 16.3 | | | |
| alkali derived from $Na_2CO_3$ in decomposed Bayer liquor | 0 | 0 | 0 | 0 | 0 | 0 | 15.4 | 16.3 | | 16.3 | 16.3 | 16.3 |

TABLE I-continued

| PROCESS CONDITIONS | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Composition of Reaction Medium | | | | | | | | | | | | |
| aluminate content ($Al_2O_3$ g/l) | 51.6 | 51.6 | 51.6 | 51.6 | 63.1 | 63.1 | 51.2 | 45.1 | 45.1 | 46.3 | 46.3 | 46.3 |
| total alkali content ($Na_2O$ g/l) | 129.5 | 129.5 | 129.5 | 129.5 | 125.6 | 125.6 | 107.2 | 102.2 | 102.2 | 105.2 | 105.2 | 105.2 |
| alkali derived from $Na_2CO_3$ ($Na_2O$ g/l) | 0 | 0 | 0 | 0 | 0 | 0 | 12.3 | 11.8 | 11.8 | 13 | 13 | 13 |
| silicate content ($SiO_2$ g/l) | 23.8 | 23.8 | 23.8 | 23.8 | 37.9 | 37.9 | 39.8 | 54.3 | 54.3 | 46.2 | 46.2 | 46.2 |
| water content ($H_2O$ g/l) | 966.7 | 966.7 | 966.7 | 966.7 | 959.8 | 959.8 | 967 | 966.6 | 966.6 | 969 | 969 | 969 |
| Silicate Solution | | | | | | | | | | | | |
| silicate content calculated as $SiO_2$ | 216.2 | 216.2 | 216.2 | 216.2 | 216.2 | 216.2 | 199 | 199 | 199 | 204 | 204 | 204 |
| alkali content calculated as $Na_2O$ | 106.5 | 106.5 | 106.5 | 106.5 | 106.5 | 106.5 | 92 | 92 | 92 | 94 | 94 | 94 |
| Temperature of the Reactants in °C. | 80 | 80 | 80 | 80 | 65 | 65 | 75 | 74 | 74 | 75 | 75 | 75 |
| Gel Formation Temperature in °C. | 80 | 80 | 80 | 80 | 85 | 85 | 75 | 74 | 74 | 75 | 75 | 75 |
| Period of Time for Adding the Silicate Solution in Minutes | 30 | 30 | 30 | 30 | 30 | 30 | 45 | 40 | 40 | 30 | 30 | 30 |
| Volume of the Reaction Medium In Liters | 18 | 180 | 18000 | 18000 | 18 | 18000 | 2500 | 2750 | 2750 | 3200 | 3200 | 180 |
| Addition By Means of a Venturi-Device | No | No | No | Yes | No | Yes | Yes | Yes | Yes | No | Yes | No |
| Addition Without Venturi-Device | Yes | Yes | Yes | No | Yes | No | No | No | No | Yes | No | Yes |
| Crystallization Temperature in °C. | 85 | 85 | 85 | 85 | 85 | 81 | 81 | 81 | 81 | 81 | 81 | 81 |
| Final Concentration Calculated as g/l of Anhydrous Product | 60 | 60 | 60 | 60 | 100 | 100 | 90 | 95 | 95 | 1120 | 120 | 120 |
| Crystallization Period in Hours | 2 h 30 | 2 h 30 | 2 h 30 | 2 h 30 | 2 h | 2 h | 2 | 2 | 2 | 3 | 3 | 3 |
| *Cation Exchange Capacity Calculated as mg $CaCO_3$/g of Anhydrous Product | 285 | 290 | 245 | 285 | 265 | 290 | 286 | 278 | 282 | 298 | 285 | 245 |
| % Residue Not Passing Through a 10 μ Mesh Size Sieve | 3 | 5 & 6 | 12 | 3 | 6 | 3 | 3 | 2 | 2 | 7 | 2 | 5 |
| % Residue Not Passing Through a 15 μ Mesh Size Sieve | 0 | 0.8 | 2 | 0 | 0.9 | 0 | 0.3 | 0.2 | 0.5 | 3 | 0.2 | 0.8 |
| Mean Diameter in μ | 4 | 5 | 8 | 4 | 6 | 4 | 3.4 | 3.6 | 3.8 | 8 | 3.2 | 5 |
| Degree of 4A Crystallization (% Crystalline Product) | 94 | 95 | 96 | 96 | 96 | 94 | 94 | 92 | 92 | 85 | 98 | 98 |

*See Col. 13.

The calcium binding power of the aluminosilicates is determined as follows:

1 g of the alumino silicate (active material) is added to 1 l of an aqueous solution containing 0.594 g of $CaCl_2$ (which is equivalent to a CaO concentration of 300 mg/l or a hardness of 53.3°) which is adjusted to a pH value of 10 by means of a diluted sodium hydroxide solution.

Subsequently, the suspension is thoroughly agitated for a period of 15 minutes at a temperature of 22° ±2° C. Then the aluminosilicate is filtered off and the residual hardness of the filtrate is determined. The calcium binding power is expressed in mg of CaO/g of active material.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the preparation of a crystalline, alkali metal aluminosilicate of type 4A by reaction between an aqueous solution of an alkali metal silicate and an aqueous solution of an alkali metal aluminate, the improvement which comprises:
   (i) introducing a flow of at least a portion of at least one of said reactant solutions into a reaction zone;
   (ii) co-introducing with said flow (i) an in line flow of at least a portion of the other reactant solution into said reaction zone;
   (iii) thus establishing in said reaction zone a liquid admixture of said aqueous reactant solutions and said liquid admixture comprising a gel-formation medium;
   (iv) establishing gel-formation elevated temperatures within said gel-formation medium to effect formation of a mixture comprising an aluminosilicate gel-phase and a mother liquor;
   (v) recycling said gel-phase/mother liquor to said flow (i);
   (vi) maintaining said gel-phase comprising said gel-formation medium under such elevated temperatures for such period of time as to effect crystallization of the alumino-silicate, and whereby a suspension of aluminosilicate crystals of type 4A in liquid phase results; and
   (vii) thence recovering said aluminosilicate crystals from said resulting liquid phase.

2. The process as defined by claim 1, wherein said reactant alkali metal aluminate is a sodium aluminate.

3. The process as defined by claim 2, wherein said reactant alkali metal silicate is a sodium silicate.

4. The process as defined by claim 3, wherein said flow (i) comprises the sodium aluminate solution and the flow (ii) comprises the sodium silicate solution.

5. The process as defined by claim 1, wherein the introduction of the reactants into said reaction zone is effected via Venturi-flow.

6. The process as defined by claim 4, wherein the sodium silicate solution is introduced into the axis of a Venturi injector, the sodium aluminate solution is coaxially injected thereinto, and the rate of recycle (v) is at least 5 times greater than the flow (ii).

7. The process as defined by claim 6, said rate of recycle being from 5 to 50 times greater.

8. The process as defined by claim 6, wherein said gel-formation temperatures established in step (iv) range from about 60° to 100° C.

9. The process as defined by claim 8, said temperatures ranging from 70° to 90° C.

10. The process as defined by claim 4, wherein said gel-formation medium is slowly agitated during crystallization.

11. The process as defined by claim 4, said aluminate solution comprising Bayer process waste liquor.

12. The process as defined by claim 4, said liquid admixture comprising an alkali content of from about 80 to 140 g/l of $Na_2O$, and an aluminate content of from about 20 to 80 g/l of $Al_2O_3$.

13. The process as defined by claim 12, said liquid admixture comprising an aluminosilicate concentration of from about 50 to 150 g/l.

14. The process as defined by claim 13, said mother liquor comprising an aluminate content of from about 5 to 50 g/l of $Al_2O_3$.

15. The process as defined by claim 14, said mother liquor comprising an alkali content of from about 70 to 130 g/l of $Na_2O$.

16. The process as defined by claim 4, further comprising the addition of sodium carbonate to said liquid admixture.

17. The process as defined by claim 16, said sodium carbonate comprising from about 5 to 40% of the total alkali content.

18. The process as defined by claim 4, at least one of said reactant solutions being pre-heated.

19. The process as defined by claim 4, the crystallization being carried out in a separate crystallization zone.

20. The process as defined by claim 1, said process being a continuous process.

21. The process as defined by claim 4, the resultant aluminosilicate having a molar ratio $Na_2O/Al_2O_3$ of about 1, a molar ratio $SiO_2/Al_2O_3$ of about 1.8 to 2, and a molar ratio $H_2O/Al_2O_3$ of about 0 to 5.

22. The process as defined by claim 4, said aluminosilicate being at least 85% by weight crystalline, less than 5% by weight hydroxysodalite, and less than 15% by weight amorphous aluminosilicate.

23. The process as defined by claim 22, 50% of the aluminosilicate particles having a mean diameter of from about 2 to 6µ, 95% of said particles being smaller than 10µ, and 99% of said particles being smaller than 15µ.

* * * * *